United States Patent
Guerin et al.

(10) Patent No.: US 9,963,178 B2
(45) Date of Patent: May 8, 2018

(54) KIT FOR CONVERTING A TANDEM ARRANGEMENT INTO A SINGLE WHEEL ARRANGEMENT FOR A TOWED AGRICULTURAL MACHINE

(71) Applicant: Deere & Company, Moline, IL (US)

(72) Inventors: Sebastien Guerin, Audeux (FR); Lionel Guiet, Gray (FR); Emmanuel Chapon, Velet (FR)

(73) Assignee: DEERE & COMPANY, Moline, IL (US)

( * ) Notice: Subject to any disclaimer, the term of this patent is extended or adjusted under 35 U.S.C. 154(b) by 0 days. days.

(21) Appl. No.: 15/239,919

(22) Filed: Aug. 18, 2016

(65) Prior Publication Data
US 2017/0050691 A1    Feb. 23, 2017

(30) Foreign Application Priority Data

Aug. 21, 2015  (DE) .............................. 102015216063

(51) Int. Cl.
| | | |
|---|---|---|
| B62D 53/08 | (2006.01) |
| B62D 61/12 | (2006.01) |
| B60B 35/02 | (2006.01) |
| A01F 15/00 | (2006.01) |
| A01F 15/08 | (2006.01) |
| A01B 51/04 | (2006.01) |

(52) U.S. Cl.
CPC .............. B62D 61/12 (2013.01); A01B 51/04 (2013.01); A01F 15/00 (2013.01); A01F 15/08 (2013.01); B60B 35/025 (2013.01)

(58) Field of Classification Search
CPC .. B62D 61/12; B60B 35/025; B60G 2300/40; B60G 2300/402

USPC .............................. 180/209; 280/86.5, 149.2
See application file for complete search history.

(56) References Cited

U.S. PATENT DOCUMENTS

| | | | | |
|---|---|---|---|---|
| 210,742 | A * | 12/1878 | Arnold .................... | B60B 35/14 301/130 |
| 1,206,728 | A * | 11/1916 | Pauly ...................... | B60B 35/14 301/130 |
| 1,227,611 | A * | 5/1917 | Hansen ................... | B60B 35/14 280/93.502 |
| 1,372,813 | A * | 3/1921 | Helseth ................... | B60B 35/02 280/80.1 |

(Continued)

FOREIGN PATENT DOCUMENTS

| | | |
|---|---|---|
| EP | 2220929 A1 | 8/2010 |
| GB | 2083790 A | 3/1982 |

OTHER PUBLICATIONS

German Search Report in foreign counterpart application No. 102015216063.7, dated Dec. 19, 2016 (8 pages).

(Continued)

*Primary Examiner* — Joseph M Rocca
*Assistant Examiner* — Conan Duda (57) ABSTRACT

A kit for converting a tandem arrangement into a single-wheel arrangement for a towed agricultural machine includes an adapter with an attachment flange and fastener holes formed in this flange for the attachment of the attachment flange to a machine frame of the towed agricultural machine, a supporting axle mount formed on the attachment flange, a single-wheel axle arranged on the attachment flange, and a wheel flange arranged on the single-wheel axle for attaching a wheel rim.

4 Claims, 7 Drawing Sheets

(56) References Cited

U.S. PATENT DOCUMENTS

| | | | | |
|---|---|---|---|---|
| 1,480,462 A * | 1/1924 | Owen | ................... | B60B 35/14 180/906 |
| 1,480,492 A * | 1/1924 | Behnke | ................... | A01J 5/10 137/105 |
| 1,855,868 A * | 4/1932 | Porter | ................... | B60G 5/047 180/22 |
| 1,981,449 A * | 11/1934 | Fageol | ................... | B60G 5/053 180/24.02 |
| 1,981,593 A * | 11/1934 | Fageol | ................... | B60G 5/053 180/24.02 |
| 2,123,533 A * | 7/1938 | Johnston | ............. | B60B 35/1027 172/507 |
| 2,857,169 A * | 10/1958 | Spannhake | ......... | B60B 35/1018 280/638 |
| 3,810,516 A * | 5/1974 | Reimer | ................... | B60G 5/01 172/830 |
| 3,900,119 A * | 8/1975 | Olsen | ................... | B60P 3/125 212/301 |
| 3,918,736 A | 11/1975 | Hickman | | |
| 4,007,949 A * | 2/1977 | Norcia | ................... | B60B 15/00 267/48 |
| 4,577,711 A | 3/1986 | Butler | | |
| 5,269,593 A * | 12/1993 | Wasson | ................ | B60B 35/025 301/124.1 |
| 5,308,216 A * | 5/1994 | Herolf | ................... | A01G 23/006 180/209 |
| 5,339,611 A * | 8/1994 | Roderfeld | ............... | B60G 5/00 180/209 |
| 5,361,860 A * | 11/1994 | Smith | ................... | B62D 55/04 180/190 |
| 5,655,615 A * | 8/1997 | Mick | ................... | B60G 5/02 180/24.02 |
| 6,003,616 A | 12/1999 | Goins et al. | | |
| 6,112,843 A * | 9/2000 | Wilcox | ................ | B60K 17/342 180/209 |
| 6,164,679 A * | 12/2000 | Lay | ................... | B60P 3/1083 280/414.1 |
| 6,543,566 B1 * | 4/2003 | Mason | ................ | A01D 87/127 180/209 |
| 6,962,369 B2 * | 11/2005 | Hellums | ................ | B60G 11/04 280/124.175 |
| 7,044,250 B1 * | 5/2006 | Elsberry | ................... | B60G 1/02 180/209 |
| 7,108,336 B2 * | 9/2006 | Dombroski | ............. | B60B 35/14 29/402.13 |
| 7,237,789 B1 * | 7/2007 | Herman | ................... | B60D 1/485 280/405.1 |
| 7,837,220 B2 | 1/2010 | Sergison et al. | | |
| 8,029,021 B2 * | 10/2011 | Leonard | ................ | B60G 3/20 180/21 |
| 8,348,001 B2 * | 1/2013 | Isfort | ................ | A01D 41/12 180/209 |
| 8,602,153 B2 * | 12/2013 | Osswald | ................ | B62D 21/14 180/209 |
| 8,794,358 B2 * | 8/2014 | Hansen | ................ | B62D 55/04 180/9.21 |
| 8,801,115 B2 * | 8/2014 | Hansen | ................ | B62D 55/04 180/9.21 |
| 8,820,758 B2 * | 9/2014 | Schwinn | ................ | B62D 61/12 180/209 |
| 9,517,693 B2 * | 12/2016 | Elliott | ................... | B60K 17/36 |
| 2004/0090034 A1 * | 5/2004 | Hori | ................... | B60G 5/04 280/124.128 |
| 2005/0034910 A1 * | 2/2005 | Hinton | ................... | B62H 1/12 180/209 |
| 2005/0035583 A1 * | 2/2005 | Hinton | ................... | B62D 61/04 280/755 |
| 2006/0032691 A1 * | 2/2006 | Strong | ............... | B60G 17/0165 180/237 |
| 2006/0042848 A1 * | 3/2006 | Bushinski | ............. | B62D 61/12 180/209 |
| 2006/0254840 A1 * | 11/2006 | Strong | ................... | B60G 5/00 180/190 |
| 2006/0254841 A1 * | 11/2006 | Strong | ................... | B60G 5/00 180/190 |
| 2007/0095590 A1 * | 5/2007 | Cho | ................... | B62K 13/04 180/209 |
| 2008/0087483 A1 * | 4/2008 | Ward | ................... | B62D 61/12 180/210 |
| 2008/0236437 A1 * | 10/2008 | Shagbazyan | ............. | B60G 3/12 105/215.2 |
| 2009/0039681 A1 * | 2/2009 | Bogelein | ................... | B66F 9/06 296/203.01 |
| 2010/0072733 A1 | 3/2010 | Levi | | |
| 2015/0197304 A1 * | 7/2015 | Kroening, Jr. | ......... | B62K 13/04 180/209 |
| 2015/0353159 A1 * | 12/2015 | Yelvington | ............ | B62K 11/02 180/209 |
| 2017/0050691 A1 * | 2/2017 | Guerin | ................... | A01F 15/00 |

OTHER PUBLICATIONS

European Search Report in foreign counterpart application No. 16182761.3, dated Jan. 23, 2017 (5 pages).

* cited by examiner

KIT FOR CONVERTING A TANDEM ARRANGEMENT INTO A SINGLE WHEEL ARRANGEMENT FOR A TOWED AGRICULTURAL MACHINE

CROSS-REFERENCE TO RELATED APPLICATIONS

Pursuant to 35 USC § 119, this application claims the benefit of and priority to German patent application no. 102015216063.7, filed on Aug. 21, 2015, which is herein incorporated by reference in its entirety.

FIELD OF THE DISCLOSURE

The disclosure relates to a kit for converting a tandem arrangement into a single-wheel arrangement for a towed agricultural machine.

BACKGROUND

Towed agricultural machines, for example, harvesting machines, such as balers, or planting or sowing machines, soil cultivation machines, agricultural sprayers, or also attachments and wagons for transporting agricultural products are known. It is further known to equip such machines with a tandem arrangement for a two-wheel tire set on both sides of a machine frame, wherein each set of two wheels is supported on a swivel-mounted tandem axle carrier that is oscillatingly suspended on a supporting axle connected to the machine frame. The machine frame is here usually structurally designed on such a tandem arrangement and provides corresponding strength and deformation stability that is usually higher due to higher bearing loads than for a machine with a single-wheel arrangement on which, on both sides of the machine frame, only one wheel is arranged on a single-wheel supporting axle. Manufacturers of agricultural towed machines offer either machines with a tandem arrangement and a machine frame designed accordingly for a tandem arrangement, or machines with a single-wheel arrangement and a machine frame designed accordingly for a single-wheel arrangement. A machine frame that is suitable for both arrangements is therefore uneconomical in production because a machine frame that is suitable for a tandem arrangement is over-dimensioned for a single-wheel arrangement, and a machine frame that is suitable for a single-wheel arrangement would be under-dimensioned for a tandem arrangement. This usually has the result that manufacturers decide on one of the arrangements for a machine type or for a machine series in order to be able to ultimately have favorable manufacturing with little part venation. Often, however, in use on the field, a machine for high bearing loads with a tandem arrangement is not absolutely necessary or a machine for lower bearing loads with a single-wheel arrangement is not sufficient. It is also a concern of the operator of agricultural machines to reduce the soil contact pressure or the rolling resistance of the towed machine depending on the weather and/or soil conditions, wherein a tandem arrangement generates a lower soil contact pressure relative to a single-wheel arrangement, but a single-wheel suspension has a lower rolling resistance relative to a tandem arrangement. To be able to provide the option of a tandem arrangement or a single-wheel arrangement for use on the field, the operator therefore must purchase two machines, which is usually associated with higher costs. If there is doubt, he might also be forced to switch the supplier or the manufacturer, which can have disadvantageous financial or also qualitative disadvantages for the operator.

SUMMARY

The problem forming the basis of the disclosure is to disclose an adapter for a towed agricultural machine of the type named above, through which the problems named above can be solved.

The problem is solved according to the disclosure by the teaching of claims 1 and 2.

According to the disclosure, a kit of the type named above comprises an adapter with attachment flange and fastener holes formed in this flange for the attachment of the attachment flange to a machine frame of a towed agricultural machine, a supporting axle mount formed on the attachment flange, a single-wheel axle arranged on the attachment flange, and a wheel flange arranged on the single wheel axle for the attachment of a wheel rim. An operator thus has the ability to convert an agricultural machine equipped with a tandem arrangement into a single-wheel arrangement by removing a tandem axle carrier and attaching the adapter, without having to perform additional structural changes, in particular, to the machine frame that remains unchanged both for one arrangement and the other. Thus, the option is given to the operator to operate the machine selectively and as needed and desired in tandem arrangement or in single-wheel arrangement with only one machine. For the manufacturer, it is therefore possible to install only one machine frame type in an assembly line, but to offer both variants of wheel arrangements on one machine type or machine series. The adapter with attachment flange engages the supporting axle of the machine frame, where, on the manufacturer's side, the tandem axle carrier is swivel-mounted, which minimizes conversion measures. For this purpose, on the rear side of the attachment flange, there is a supporting axle mount, for example, in the form of a hole or a fitting or opening that is complementary to one supporting axle end of the supporting axle, in which the supporting axle of the machine frame is held or is put or pushed over the supporting axle end. By means of threaded pins that are guided through passage holes formed in the attachment flange and corresponding threaded holes provided or formed in the machine frame, the adapter is bolted to the machine frame in an installation-friendly manner, wherein the mounting of the supporting axles in the supporting axle mount simultaneously offers an accurately fitting positioning for the attachment flange, structural stability, and a suitable installation aid. Through a centered arrangement of the supporting axle mount, a manufacturing-friendly, rotationally symmetric shape can be selected for the attachment flange. Here, however, other forms are also conceivable, because the attachment flange does not necessarily have to have a rotationally symmetric construction. For a supporting axle that is at a somewhat higher height with respect to the wheel axles arranged on a tandem carrier, a centered supporting axle mount with the wheel axle oriented centered relative to this mount on the attachment flange is advantageous, because for the single-wheel arrangement, the individual wheel is at the same height as the respective wheels for the tandem arrangement. Thus, these same wheels can be used for both arrangements. Furthermore, for the same height settings for both arrangements, it is guaranteed that the machine can be operated with a constant ground clearance for the conversion from one arrangement to the other. This can prove significant when soil working tools or machines have been set on the machine, for example, a harvested goods pick-up machine of a baler, the sprayer connector bars of an agricultural sprayer, or soil working tools of a planting, sowing, or tilling machine. So that the same height of the wheels can be maintained for the conversion and for a tandem arrangement, the supporting axle can assume a different height with respect to the wheels axles arranged on the tandem carrier, and the supporting axle mount arranged on the attachment flange can be arranged on the outside accordingly both for the attachment flange and/or for the wheel axle. Alternatively, different heights can be compensated by accordingly different wheel sizes. The wheel flange arranged on the adapter or on the wheel axle can be constructed in an installation-friendly manner in the same dimensions as the wheel flange formed on the wheel axles of the tandem carrier, so that the rim size and rim type are compatible.

Through the kit described above in connection with a towed agricultural machine with tandem arrangement, the machine can be constructed such that it is suitable for the selective operation of a tandem arrangement or a single-wheel arrangement, wherein supporting axles are formed on a machine frame of the machine on both sides for the selective attachment of a tandem axle carrier or an adapter described above, wherein selectively a tandem axle carrier or the adapter can be attached on both sides, each holding the supporting axle, on the machine frame of the towed agricultural machine.

With reference to the drawing that shows an embodiment of the disclosure, the disclosure and additional advantages and advantageous developments and constructions of the disclosure will be described and explained in more detail below.

BRIEF DESCRIPTION OF THE DRAWINGS

Shown are.

DETAILED DESCRIPTION

Figure 1:
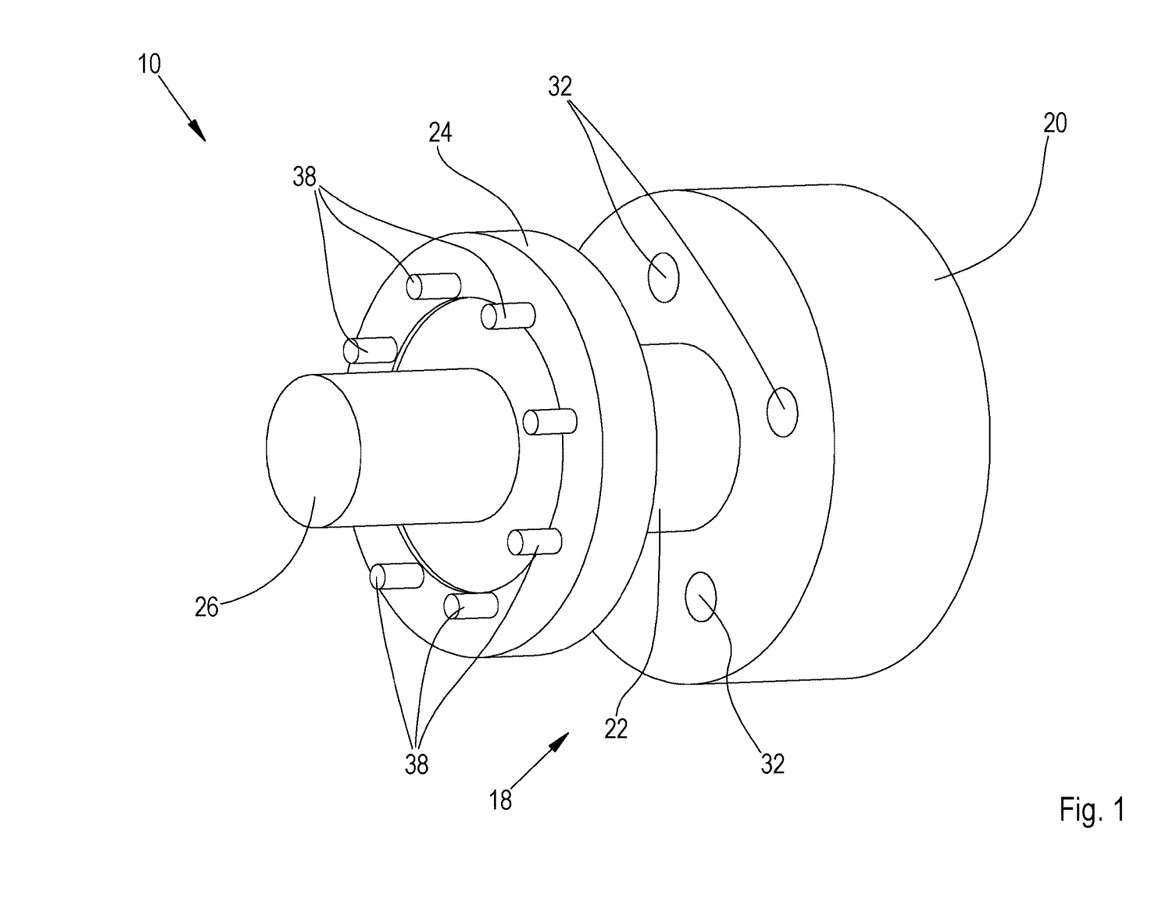
FIG. 1, a schematic perspective front side view of a kit for converting a tandem arrangement into a single-wheel arrangement for a towed agricultural machine, FIG. 2, a schematic perspective rear side view of the kit of FIG. 1, FIG. 3, a schematic perspective side view of a towed agricultural machine with wheels in a tandem arrangement, FIG. 4, a schematic perspective side view of the towed agricultural machine from FIG. 3 with wheels dismounted from a tandem axle carrier, FIG. 5, a schematic perspective side view of the towed agricultural machine according to FIG. 4 with tandem axle carrier dismounted from a supporting axle, FIG. 6, a schematic perspective side view of the towed agricultural machine according to FIG. 5 with the kit from FIGS. 1 and 2 that can be mounted on the supporting axle, and FIG. 7, a schematic perspective side view of the towed agricultural machine from FIGS. 3 to 6 in a single-wheel arrangement with a mounted wheel.
Figure 2:
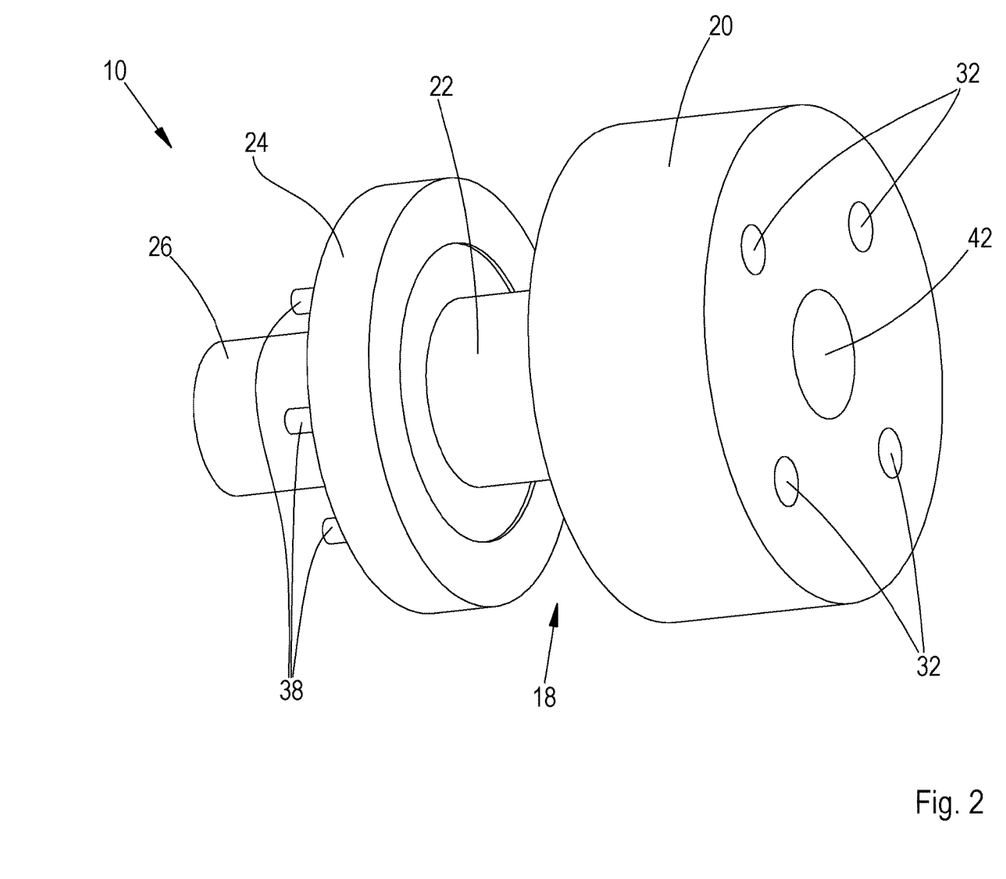
Figure 3:
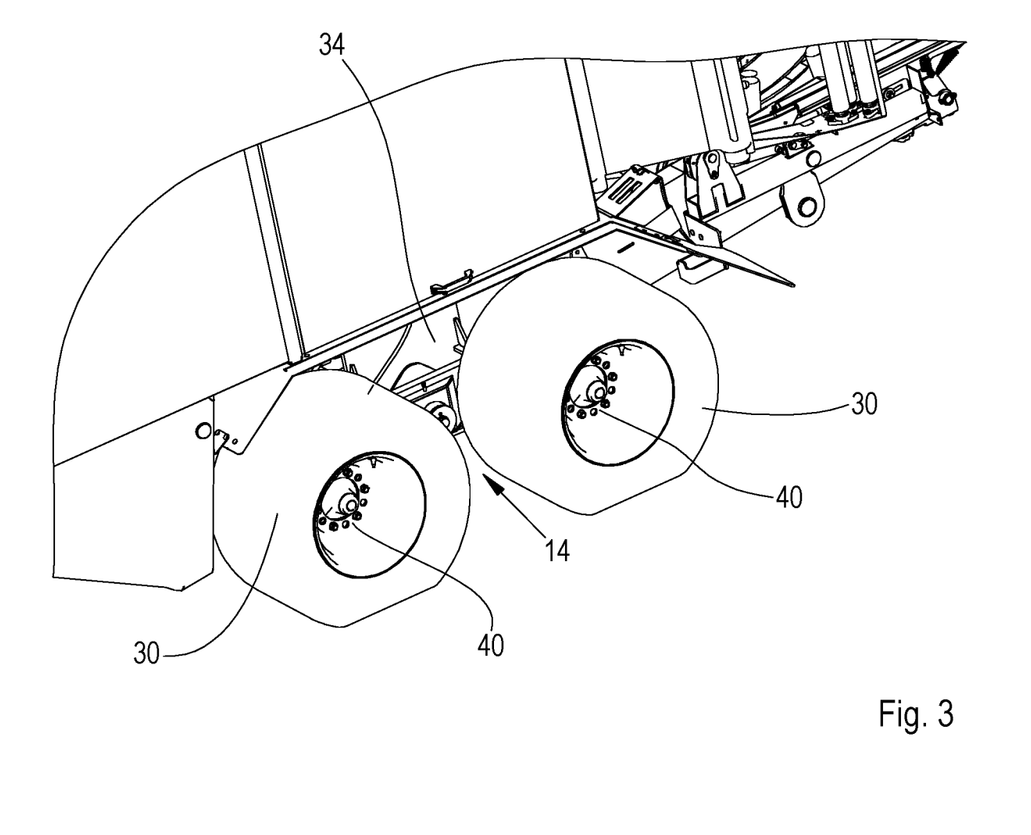
Figure 4:
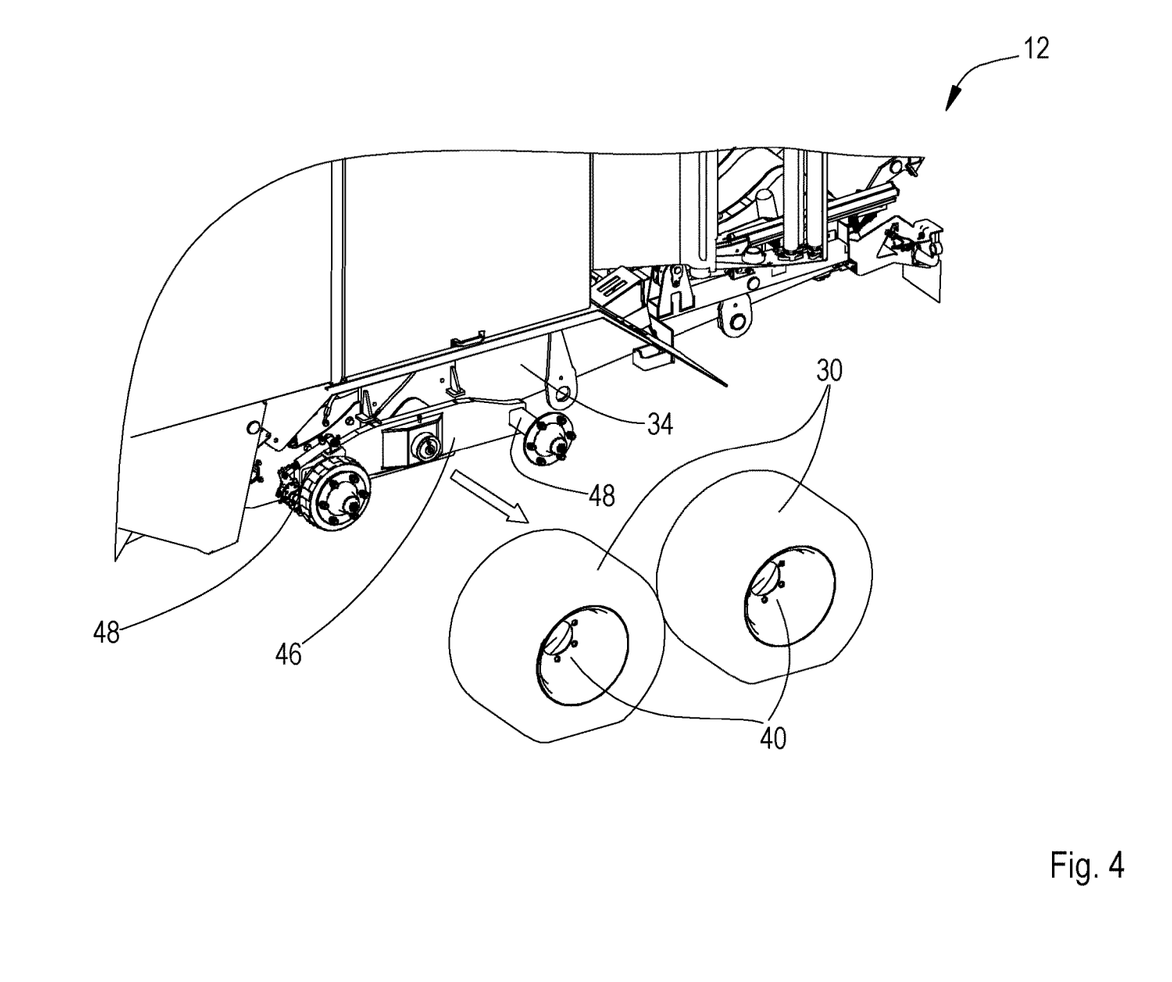

A kit 10 shown schematically in FIGS. 1 and 2 for converting a towed agricultural machine 12 (see FIGS. 3 to 7) with a tandem arrangement 14 into a single-wheel arrangement 16 comprises an adapter 18 with a cylindrical attachment flange 20, a wheel axle 22 mounted on the attachment flange 20, a wheel flange 24 supported on the wheel axle, and a wheel hub 26 formed on the wheel flange 24 on a front side of the adapter 18 for holding a wheel rim 40 of a wheel 30.

The attachment flange 20 comprises continuous fastener holes 32 arranged over the periphery of the flange, with which the attachment flange 20 can be mounted or attached to a machine frame 34 of the agricultural machine 12 by means of threaded bolts (not shown) in threaded holes 36 provided on the machine frame 34. On the front side of the adapter 18, starting from the wheel flange 24, threaded bolts 38 extend for fastening a wheel rim 40.

On the back side of the adapter 18 (see FIG. 2), the attachment flange 20 is formed with a central receptacle 42 or recess or hole supporting axle mount 42) for holding one of supporting axles 44 arranged on both sides of the machine frame 34. The supporting axle 44 is equipped in the tandem arrangement 14 with a tandem axle carrier 46, wherein the tandem axle carrier 46 is oscillatingly suspended centrally on the supporting axle 44. On the side of the tandem axle carrier 46 there extend two wheel axles 48 at the same distance to the center of the tandem axle carrier 46, wherein the wheels 30 in the tandem arrangement 14 are mounted on these wheel axles (see FIG. 3).

Figure 5:
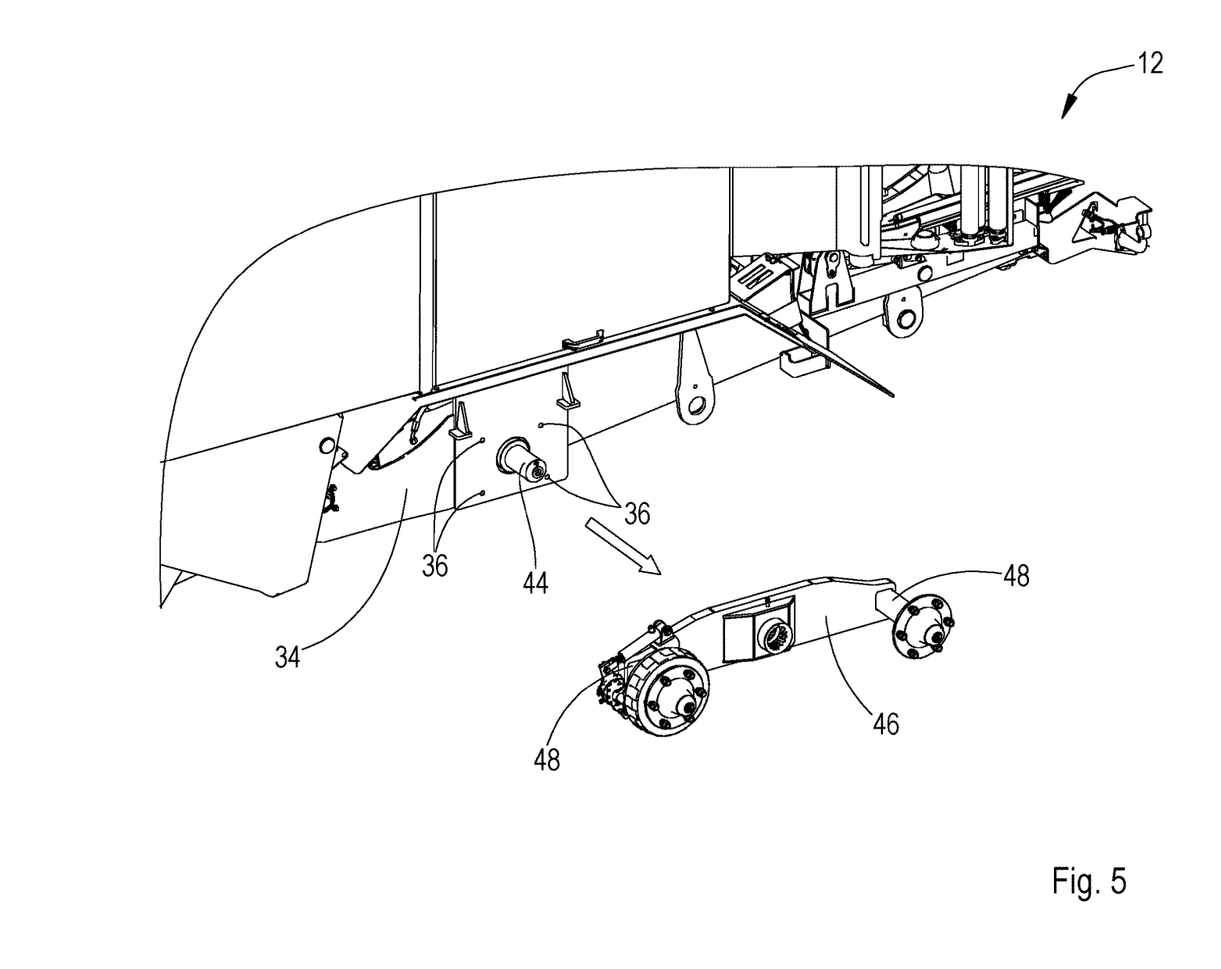
Figure 6:
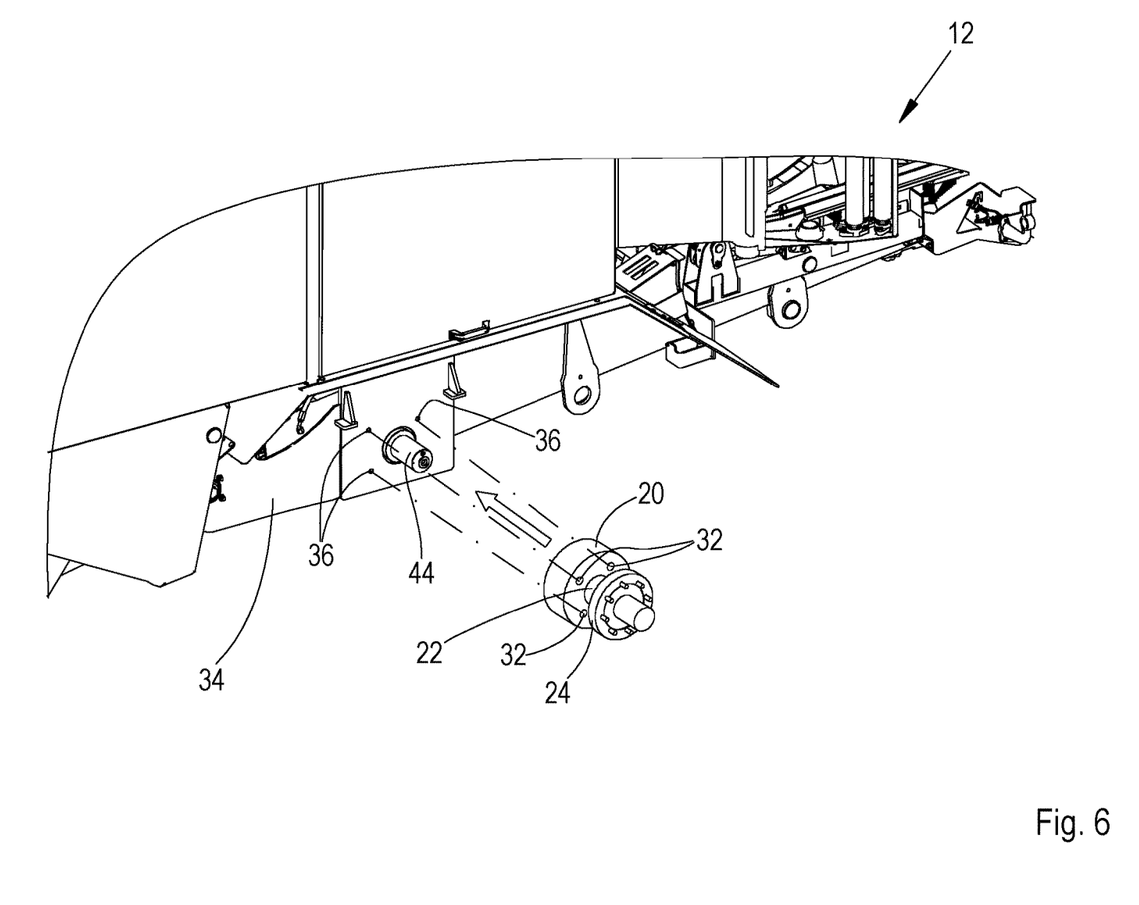
Figure 7:
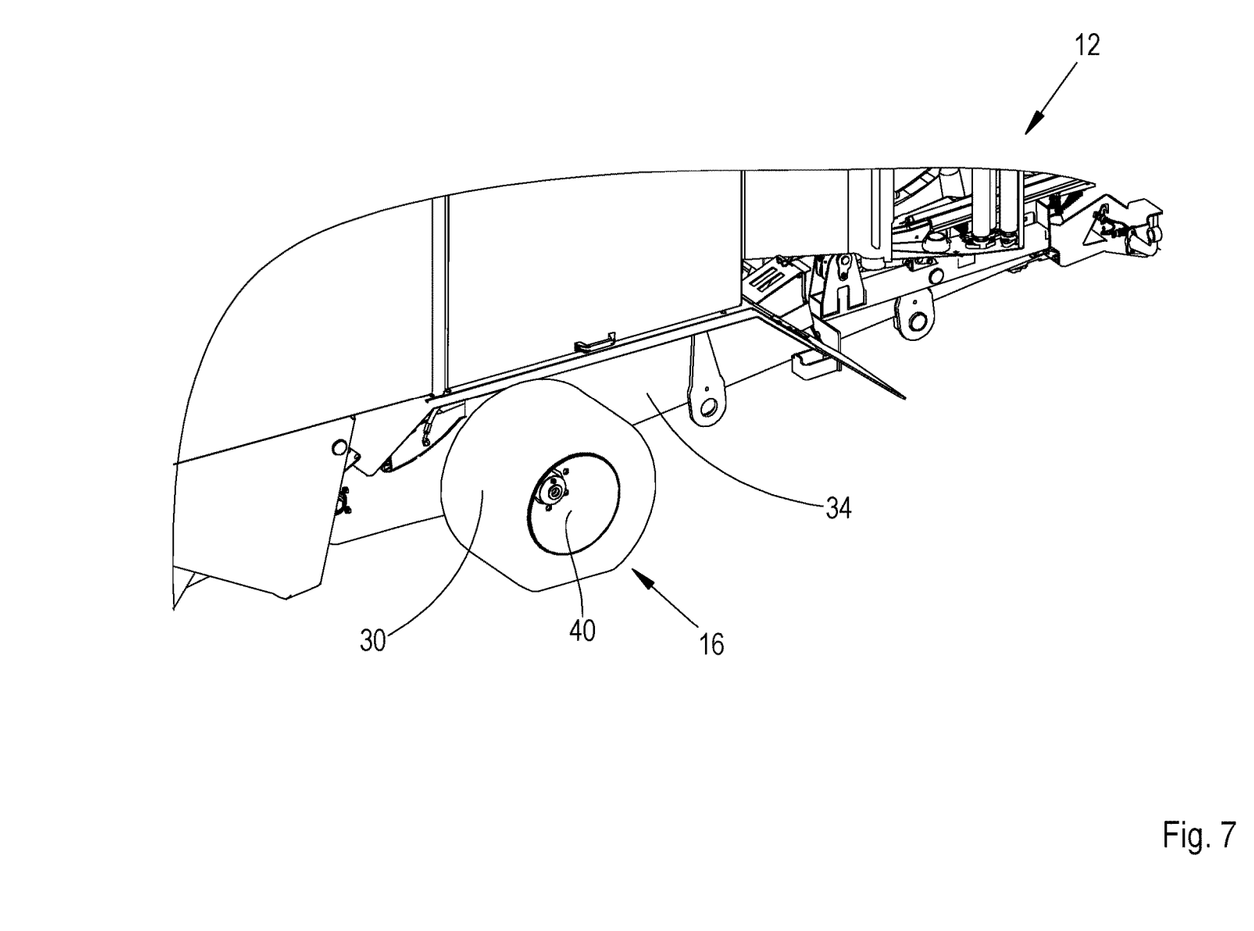

For converting the agricultural machine with a tandem arrangement 14 into the single-wheel arrangement 16, as shown in FIGS. 4 to 7, first the wheels 30 are removed from the wheel axles 48 (FIG. 4) and the tandem axle carrier 46 is dismounted from the supporting axle 44 (FIG. 5). Then the adapter 18 from the kit 10 is attached (FIG. 6), wherein the adapter 18 is pushed or placed with its supporting axle mount 42 formed on the back side onto the end of the supporting axle 44 and is bolted to the threaded holes 36 provided on the machine frame by means of the fastener holes 32 formed on the attachment flange 20 and threaded bolts (not shown). Then one of the previously dismounted wheels or a spare wheel (not shown) is set on the wheel flange 24 of the adapter 18 and fastened to the threaded bolts 38 by means of threaded nuts (not shown) provided for this purpose (FIG. 7). The conversion of the tandem arrangement 14 into the single-wheel arrangement 16 is repeated in the same way on the opposite side of the agricultural machine. A conversion from the single-wheel arrangement 16 to the tandem arrangement 14 is realized with the reverse of this sequence on both sides of the agricultural machine 10.

As an example, a towed agricultural machine 10 was shown here in the form of a round baler with winder (combination press). The conversion described above of a tandem arrangement 14 into a single-wheel arrangement 16, however, can take place on any arbitrary towed agricultural machine, for example, on a simple round baler, a large baler, a towed agricultural sprayer, a planting machine, a sowing machine, a soil cultivating machine, an unloading wagon, a trailer, and other agricultural machines.

The invention claimed is:
1. A kit for converting a tandem arrangement into a single-wheel arrangement for a towed agricultural machine, comprising:
   a machine frame,
   a supporting axle protruding from an outer side of the machine frame,
   a tandem axle carrier of the tandem arrangement, the tandem axle carrier coupled to two wheel rims,
   an adapter with an attachment flange and fastener holes formed in the attachment flange for the attachment of the attachment flange to a machine frame of a towed agricultural machine to replace a tandem axle carrier, a supporting axle mount formed on the attachment flange to accommodate the supporting axle, a single-wheel axle arranged on the attachment flange, and a wheel flange arranged on the single-wheel axle for attaching one of the two wheel rims.

2. A towed agricultural machine, for the selective operation in a tandem arrangement or a single-wheel arrangement, comprising:

a machine frame, and a supporting axle protruding from each of two sides of the machine frame, a tandem axle carrier coupled to two wheel rims, an adapter including;

an attachment flange and fastener holes formed in the attachment flange for selective attachment to the machine frame, a supporting axle mount formed on the attachment flange to accommodate the supporting axle, a single-wheel axle arranged on the attachment flange, and a wheel flange arranged on the single-wheel axle for attaching one of the two wheel rims, and wherein the tandem axle carrier and the adapter can selectively be exchanged to attach to the supporting axles.

3. The kit of claim 1, wherein the attachment flange comprises a first side which is a flat plane and a second side opposite to the first side, the fastener holes extending from the first side to the second side, and the surface of the first side is completely disposed on and attached to the machine frame.

4. The towed agricultural machine of claim 2, wherein the attachment flange comprises a first side which is a flat plane and a second side opposite to the first side, the fastener holes extending from the first side to the second side, and the surface of the first side is completely disposed on and attached to the machine frame.

* * * * *